United States Patent [19]

Olah

[11] 3,745,316

[45] July 10, 1973

[54] COMPUTER CHECKING SYSTEM

[75] Inventor: George Olah, London, England

[73] Assignee: Elliott Brothers (London) Limited, London, England

[22] Filed: Dec. 13, 1971

[21] Appl. No.: 207,017

[52] U.S. Cl. .......... 235/153 A

[51] Int. Cl. .......... G06f 11/00

[58] Field of Search .......... 235/153 AK; 444/1 A; 340/172.5

[56] References Cited

UNITED STATES PATENTS

| | | | |
|---|---|---|---|
| 3,518,413 | 6/1970 | Holtey | 235/153 AK |
| 3,551,659 | 12/1970 | Forsythe | 235/153 AK |

OTHER PUBLICATIONS

Glickstein, Weighted Checksum to Detect and Restore Altered Bits in Computer Memory, IBM Tech. Discl. Bulletin, Vol. 13, No. 10, March 1971.

Flanagan, Program Monitoring Means, IBM Tech. Discl. Bulletin, Vol. 13, No. 8, Jan. 1971, pp. 2399–2401.

*Primary Examiner*—Charles E. Atkinson

*Attorney*—Morris Kirschstein, Bertram Ottinger et al.

[57] ABSTRACT

In a computer, a monitoring means for the detection of faults in operation comprises checksum forming means for forming concurrently with the performance of a program by the computer, a checksum of words read out from the computer memory in performance of the program, and means for comparing the checksum, at intervals, against predetermined values which the checksum should have at the times of comparison if the computer is operating correctly.

5 Claims, 1 Drawing Figure

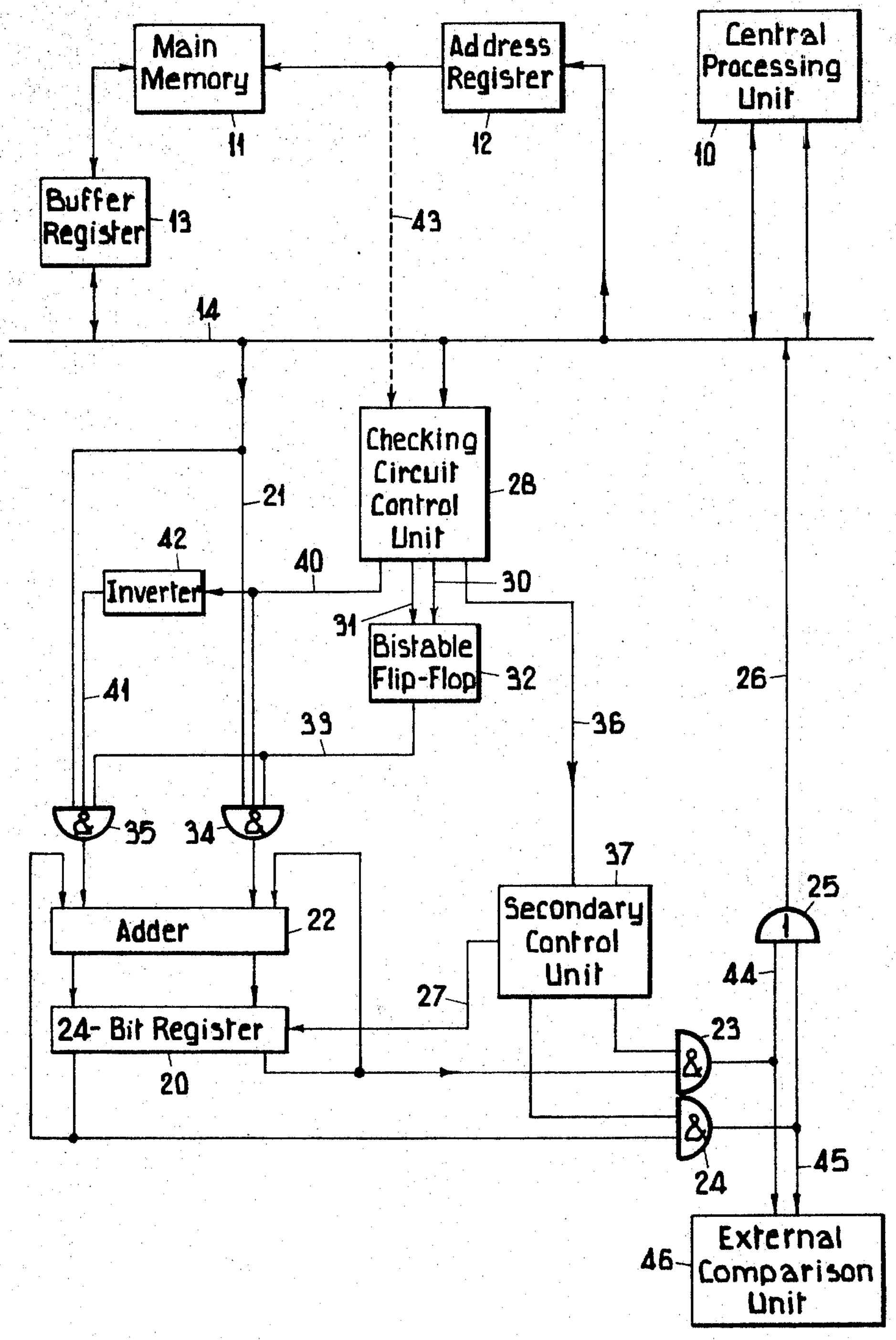
Main Memory
Address Register
Central Processing Unit
Buffer Register
Checking Circuit Control Unit
Inverter
Bistable Flip-Flop
Adder
24- Bit Register
Secondary Control Unit
External Comparison Unit
&
1
10
11
12
13
14
20
21
22
23
24
25
26
27
28
30
31
32
33
34
35
36
37
40
41
42
43
44
45
46

COMPUTER CHECKING SYSTEM

The present invention relates to computer monitoring for the detection of faults.

In certain applications of computers, it is desirable or essential to provide some means of monitoring its operation so that faults are detected. One known solution to this problem is to form checksums of certain defined areas of the computer memory, these areas containing the programs to be performed and certain types of fixed data used by these programs. The main operating program can be written to form these checksums at suitable intervals and to generate an error signal if the value of the checksum varies; and by requiring that it generate "system correct" signals at suitable intervals, a simple timer circuit can be used to detect a failure of the main operating program to perform the checking at the proper intervals.

This system suffers from the disadvantage that the checking cannot be done during the performance of a program; thus a fault occurring at the beginning of the performance of a program will not usually be detected for some time. The intervals between checks can be reduced, of course, but this will result in a loss of useful operating time, so these intervals cannot be too short. Also, if an inconsistent fault occurs, when the checksum is formed at a later time the fault may no longer be present and therefore not detected.

The object of the present invention is therefore to provide a system wherein these disadvantages are alleviated or overcome.

Accordingly, the present invention provides a computer including; monitoring means for the detection of faults comprising: checksum forming means for forming concurrently with the performance of a program by the computer, a checksum of words read out from the computer memory in performance of the program, and means for comparing the checksum, at intervals, against predetermined values which the checksum should have at the times of comparison if the computer is operating correctly.

Where, as will normally be the case, variable data words are read out from the memory in performance of a program, the checksum forming means will incorporate means for inhibiting the addition of variable data words into the checksum, so that the checksum is formed from instruction words and fixed data words but does not include variable data words.

It will be realised that this arrangement provides a running check of the actual performance of the program, not merely of the correct presence of the program statically in the computer memory. Thus errors in the program sequence during running are detected. The circuits for forming the checksum will be separate from the computing circuits per se so that some (though not much) additional circuitry is needed to perform the monitoring. Some slight modifications to the software are also needed, but since the checksum is formed in the additional circuitry, the running time is almost the same as for a normal (unchecked) system, since the normal running of the program need only be interrupted at occasional intervals for one or two cycles for checking purposes.

An embodiment of the invention will be described, by way of example, with reference to the accompanying drawing, which is a block diagram of a computer system.

The upper parts of the drawing show, in simplified form, a conventional computer system consisting of a central processing unit 10, a main memory (e.g. a core store) 11, an address register 12, a memory buffer register 13, and a main data highway 14 through which the other units of the system are interconnected. The word length is assumed to be 12 bits.

The addional circuitry required for checking is shown below the highway 14. To ensure sufficient accuracy in forming the checksum, it is desirable to use more than 12 bits for it, and a double length (24 bit) register 20 is therefore used to contain the checksum. Words to be added into this register are obtained from the highway 14 over channel 21, and are fed into register 20 via an adder 22 which adds them to the existing contents of the register. The contents of register 20 can be read out via gates 23 and 24 onto channels 44 and 45. For checking the register contents with a predetermined comparison value, the signals on channels 44 and 45 are passed onto the highway 14 via a gate 25 and channel 26, or alternatively, to an external unit 46 as is further explained below. Register 20 can be cleared to zero by a signal on line 27. The whole of the checking circuitry is controlled by a control unit 28.

Considering the checking circuitry now in more detail, it will be described with reference to the various functions which it can perform. The control unit 28 is responsive to four special checking instructions on the data highway 14, and disregards all normal instructions (i.e., instructions which operate the central processing unit 10). The four special instructions are "Start," "Stop," "Read and clear," and "Correction." These will be taken in turn.

During the running of a program, unknown input data will normally be operated on, and these must obviously not enter into the checksum. Further, some parts of a program may be allowed to be of low integrity, so that they do not need to be checked. It is therefore desirable to be able to bring the checking circuitry into operation or to switch it out of operation as required. To do this, the instructions "Start" and "Stop" are used. These two instructions are decoded by the control unit 28 to energize lines 30 and 31 respectively, and these two lines control a bistable flip-flop 32 whose state therefore determines whether or not the checking circuitry is operative. When operative, output line 33 from flip-flop 32 is energized, permitting gates 34 and 35 to be enabled; when not operative, line 33 is not energized and gates 34 and 35 are held disabled, preventing the contents of the checksum register 20 from being changed. The main control processing unit 10 treats these two instructions as "No operation."

To test the value of the checksum, the contents of the checksum register have to be made available. When the instruction "Read and clear" is recognized by the control unit 28, line 36 is energized, energizing a secondary-control unit 37. This unit 37 enables AND gates 23 and 24 in sequence, reading out the contents of the lower and upper halves of register 20 in turn onto the data highway 14 via channels 44 and 45, gate 25 and channel 26, and then energizes line 27 clearing register 20 to zero.

Under the control of the central processing unit 10, the checksum is then compared with a predetermined comparison value which may be located either in the computer memory 11 or in circuits external to the computer.

Alternatively, the comparison may be performed under the control of unit 46 connected to channels 44 and 45, which is external of the main processing unit of the computer.

It will be realised that during the running of a program, the value of the checksum will increase in a predetermined manner as long as the instructions are taken in a specified sequence. If the instruction sequence includes branches, however, then the checksum may differ according to which particular branch is followed, so that it may have various different values at a given point in the program beyond the branches, depending on which branch was followed. To avoid the checksum varying in this way, a correction instruction is inserted into appropriate branches of the program, and in response to this instruction a correction value is inserted into the checksum such that whichever branch is followed, the checksum is the same beyond the branch. The "Correction" instruction is recognized by the central processing unit 10 as calling for the reading from the memory 11 onto the highway 14 of two words which define the required correction value, but apart from this reading of these two words, no other changes occur in the central processing unit 10. The instruction is also recognized by the control circuitry 28; line 40, which is normally energized, remains energized for the first of the two words of the correction value, but is de-energized for the second. Line 41 is energized for the second word and de-energized for the first word, by means of an inverter 42. Gates 34 and 35 are therefore enabled in turn (assuming that the checking circuitry is turned on, by flip-flop 32), and the two words of the correction value are therefore added into the lower and upper halves of register 20 respectively.

For a simple branch point in a program, where the two branches join up later, the correction value can be put into either branch indifferently; the correction value is equal to the difference of the sums of the memory read outs applied to the register 20 along the two branches. For a loopback, the correction value has to be put into a suitable location along that loop and must be chosen so as to make the sum of the memory read outs along the loop and the correction value equal to zero. This ensures that the checksum remains the same, independent of the number of times the program passes through that loop. For a complicated network of branches and loops it can be shown that the other parts of the network can always be analyzed into loops and branches which can have correction values assigned to them so that the value of the checksum is always independent of the path by which it is reached.

Although the checking circuitry can be turned on and off in response to "Start" and "Stop" instructions as described above, it is nevertheless desirable to be able to check some programs which operate with variable data without having to use vast numbers of checking system "Start" and "Stop" instructions. To achieve this, certain areas of the main memory 11 are reserved for variable data areas, either temporarily or permanently, and the checking system control unit 28 is fed from the main memory address register 12, over line 43. On recognition by the control unit 28 of an address in a reserved area, the control unit 28 inhibits, by means of gates 34 and 35, the addition into the checksum of the word read out from that address. Alternatively, it may be possible to use one bit in the instruction words as a check indicator bit, in dependence on the value of which the control unit 28 inhibits the addition of the contents of the corresponding main memory location into the checksum register 20.

I claim:

1. A monitoring means for the detection of faults during performance of a program by a digital computer; said monitoring means comprising A. a processing unit, B. a memory in which are stored words that define programs which can be performed by the computer under the control of the processing unit, and C. a data highway interconnecting the memory and the processing unit and onto which words are read-out from the memory in performance of programs by the computer, the monitoring means comprising:

i. a register;

ii. control means, responsive to signals on a data highway of the computer, for forming in the register concurrently with the performance of a program by the computer of a sum of words read out from the computer memory onto the data highway in performance of that program;

iii. read out means under the control of said control means for reading out the sum in the register at intervals; and iv. comparison means for comparing the output of the read-out means against predetermined values which the sum in the register should have at the times of read-out if the computer is operating correctly.

2. A monitoring means according to claim 1 wherein the control means includes gate means via which the input of the register is connected with the data highway of the computer, and means for enabling the gate means in response to a first instruction word on the data highway and disabling the gates in response to a second instruction word on the data highway, whereby selected words only are entered in the register.

3. A monitoring means according to claim 2 wherein the read-out means includes further gate means via which the output of the register is connected with the comparison means, and the control means additionally includes means for enabling the further gate means and clearing the register in response to a third instruction word on the data highway.

4. A monitoring means according to claim 1 wherein the control means includes means responsive to an instruction word on the data highway for inserting a correction value in the sum in the register when the computer program sequence includes a branch such that the sum in the register when the computer program reaches a point beyond the branch is the same whichever branch is followed.

5. A monitoring means according to claim 1 wherein the control means includes means responsive to an instruction word on the data highway for inserting a correction value in the sum in the register when the program sequence includes a loop back such that the sum in the register when the computer program reaches a point beyond the loop is the same however many times the program sequence passes round the loop.

* * * * *